US010587480B2

(12) United States Patent
Singamsetty et al.

(10) Patent No.: US 10,587,480 B2
(45) Date of Patent: Mar. 10, 2020

(54) USER EXPERIENCE ENHANCEMENT USING PROXIMITY AWARENESS

(71) Applicant: WiSilica Inc., Laguna Hills, CA (US)

(72) Inventors: Suresh Kumar Singamsetty, Aliso Viejo, CA (US); Dennis Ching Chung Kwan, San Diego, CA (US)

(73) Assignee: WiSilica Inc., Laguna Hills, CA (US)

( * ) Notice: Subject to any disclaimer, the term of this patent is extended or adjusted under 35 U.S.C. 154(b) by 64 days.

(21) Appl. No.: 15/813,138

(22) Filed: Nov. 14, 2017

(65) Prior Publication Data

US 2018/0227193 A1    Aug. 9, 2018

Related U.S. Application Data

(60) Provisional application No. 62/421,638, filed on Nov. 14, 2016.

(51) Int. Cl.
| | | |
|---|---|---|
| *G06F 15/177* | (2006.01) | |
| *H04L 12/24* | (2006.01) | |
| *G06F 3/00* | (2006.01) | |
| *H04W 84/18* | (2009.01) | |
| *H04W 8/00* | (2009.01) | |

(52) U.S. Cl.
CPC ............. *H04L 41/22* (2013.01); *H04W 8/005* (2013.01); *H04W 84/18* (2013.01)

(58) Field of Classification Search
CPC ..... H04W 84/18; H04W 40/04; G06F 16/285; G06F 16/951
See application file for complete search history.

(56) References Cited

U.S. PATENT DOCUMENTS

| | | | | |
|---|---|---|---|---|
| 5,276,789 A | * | 1/1994 | Besaw | G06F 17/509 345/440 |
| 5,737,319 A | * | 4/1998 | Croslin | H04L 41/0631 370/254 |
| 5,787,252 A | * | 7/1998 | Schettler | H04L 41/0213 370/254 |
| 5,793,974 A | * | 8/1998 | Messinger | H04L 41/22 709/223 |
| 5,910,803 A | * | 6/1999 | Grau | H04L 41/12 709/224 |
| 6,040,834 A | * | 3/2000 | Jain | H04L 41/06 709/223 |
| 6,054,987 A | * | 4/2000 | Richardson | H04L 41/0893 345/440 |
| 6,115,393 A | * | 9/2000 | Engel | H04L 41/0213 370/469 |
| 6,225,999 B1 | * | 5/2001 | Jain | H04L 41/06 709/223 |
| 6,347,336 B1 | * | 2/2002 | Song | H04L 41/22 709/223 |
| 7,146,568 B2 | * | 12/2006 | Richardson | H04L 41/0893 715/736 |
| 2003/0046390 A1 | * | 3/2003 | Ball | H04L 41/12 709/224 |

(Continued)

*Primary Examiner* — Nicholas Augustine
(74) *Attorney, Agent, or Firm* — Rowan TELS LLC

(57) ABSTRACT

A user interface for controlling multiple devices connected in a mesh network. The user interface may dynamically respond to the devices connected in the mesh network. The user interface may respond to devices based on their proximity or location. The user interface may allow for grouping of device controls.

4 Claims, 16 Drawing Sheets

(56) References Cited

U.S. PATENT DOCUMENTS

| | | | |
|---|---|---|---|
| 2005/0015404 A1* | 1/2005 | Cherkasova | H04L 67/1095 |
| 2008/0014954 A1* | 1/2008 | Matsumoto | H04W 16/10 |
| | | | 455/450 |
| 2010/0085948 A1* | 4/2010 | Yu | H04L 12/66 |
| | | | 370/338 |
| 2013/0219303 A1* | 8/2013 | Eriksson | G06F 3/1454 |
| | | | 715/759 |
| 2014/0280985 A1* | 9/2014 | Maguire | H04W 4/80 |
| | | | 709/227 |
| 2015/0006758 A1* | 1/2015 | Holtman | H04L 45/127 |
| | | | 709/244 |
| 2016/0255139 A1* | 9/2016 | Rathod | H04L 67/10 |
| | | | 709/203 |
| 2017/0215228 A1* | 7/2017 | Radulescu | H04W 28/18 |

* cited by examiner

USER EXPERIENCE ENHANCEMENT USING PROXIMITY AWARENESS

CROSS-REFERENCE TO RELATED APPLICATIONS

This present disclosure claims the benefit of U.S. Provisional Application Ser. No. 62/421,638, filed on Nov. 14, 2016.

BACKGROUND

A large numbers of devices located within a home/office offer functionality and features that are principally utilized in proximity to a user (e.g., lights, television, etc.). Although interoperability between devices may exist, in current processes, configuration may require separate device specific applications to communicate with each device. The devices may be configured through a wireless pairing process, but the process may lack the ability to differentiate similar closely positioned devices causing confusion and require additional labor to properly configure. There is a need to reduce the number of screens to access and configure nearby devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Figure 1:
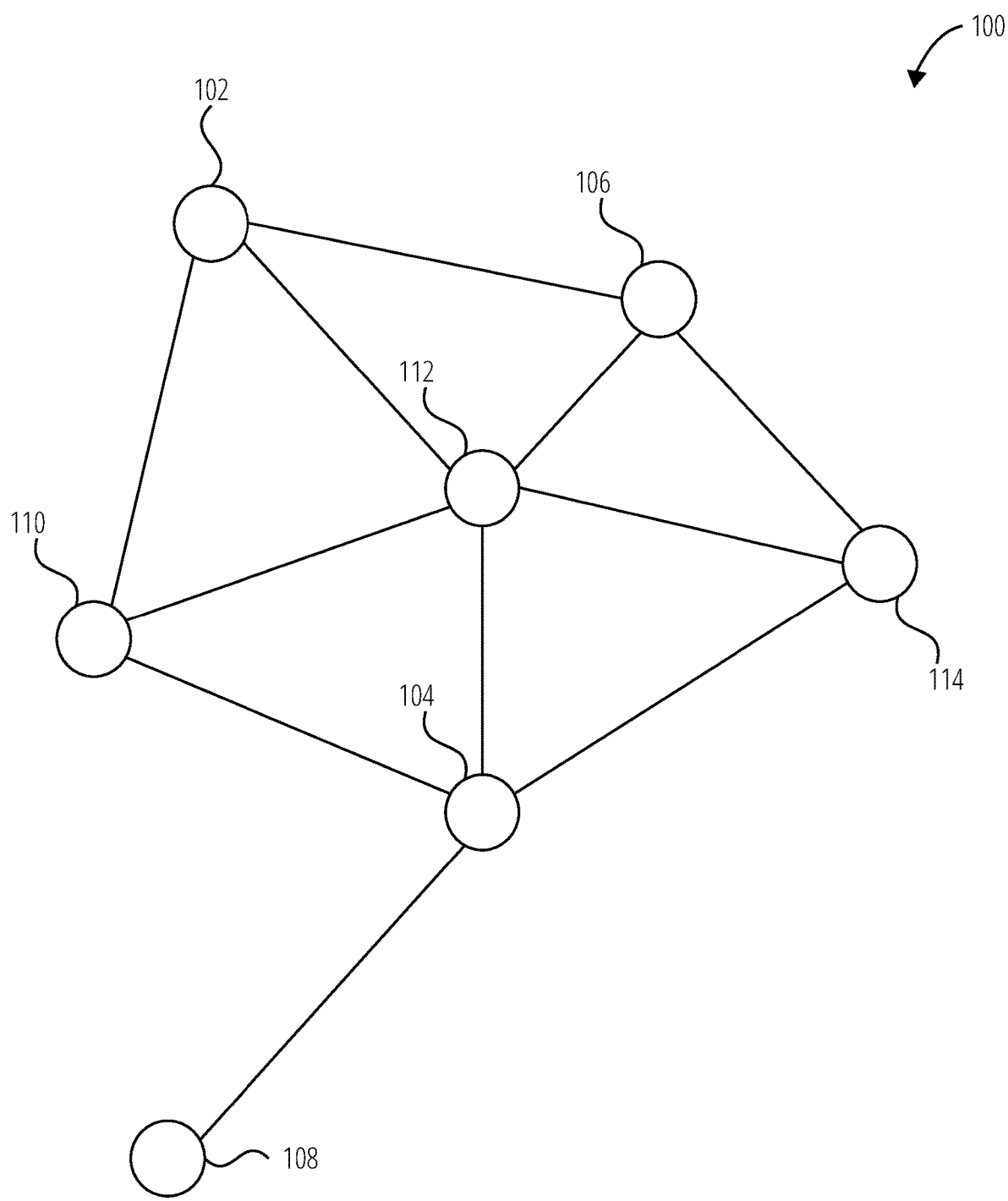
FIG. 1 illustrates a wireless mobile mesh network 100 in accordance with one embodiment.

Referring to FIG. 1, an embodiment of a wireless mobile mesh network 100 includes a server node 102, a router node 110, a router node 112, a router node 106, a router node 104, a gateway node 114, and a gateway node 108. The server node 102, the gateway node 114, and the gateway node 108 also operate as router nodes. Every node in the network participates in the routing of communications in the wireless mobile mesh network 100. The gateway node 114 and gateway node 108 provide an interface between the wireless mobile mesh network 100 and an external network, such as the Internet or a local area network. The server node 102 provides some level of centralized management for the wireless mobile mesh network 100, and may be optional if each node acts autonomously to self-manage. One or more of the nodes may be fixed in location, some of the nodes may be mobile, or all of the nodes may be mobile.

Figure 2:
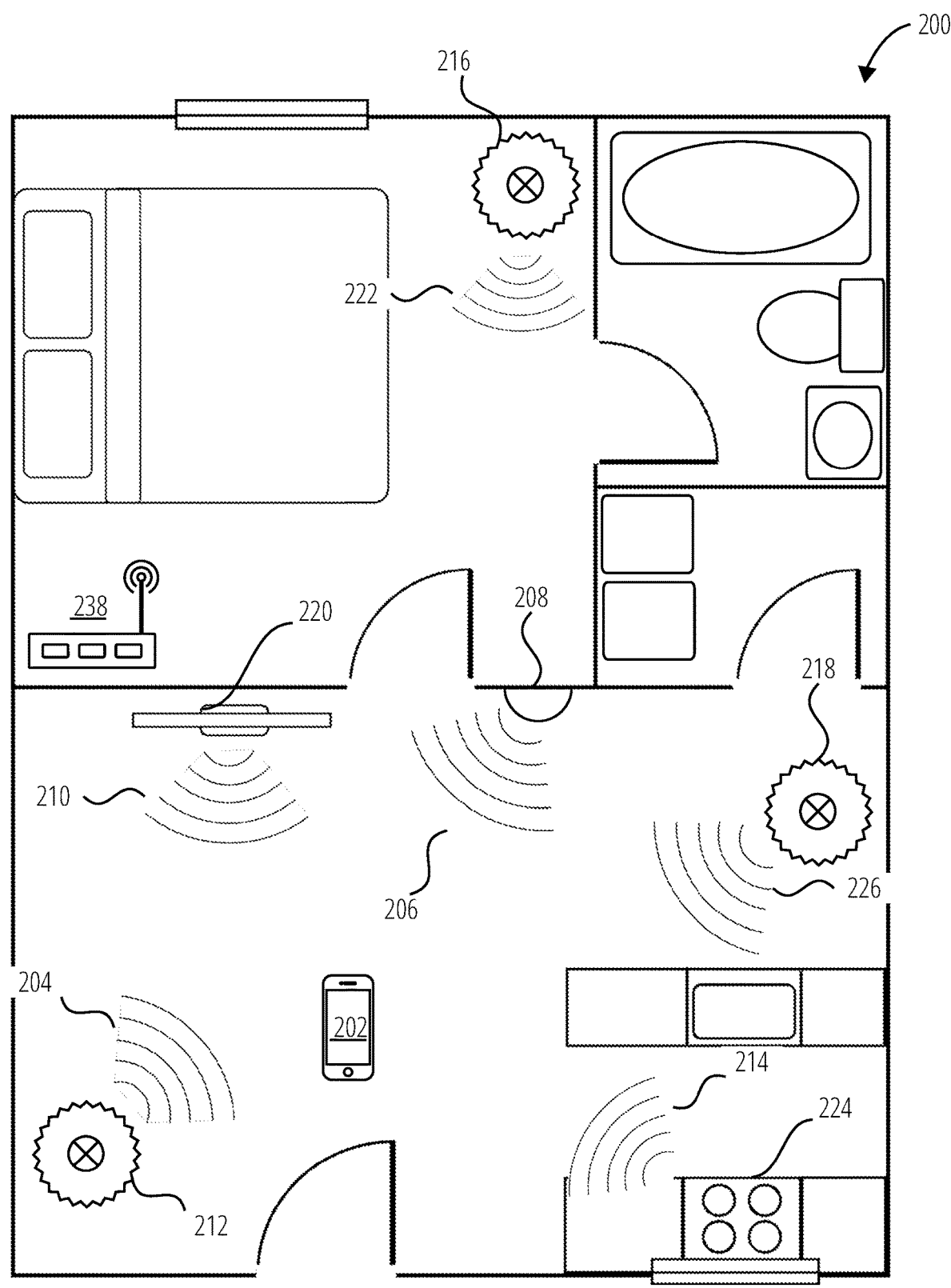
FIG. 2 illustrates an embodiment of a system environment 200.

Referencing FIG. 2, a system environment 200 comprises a mobile device 202, a living room lamp 212, a television set 220, a thermostat 208, a dining room lamp 218, an oven 224, a gateway 238, and a bedroom lamp 216. The living room lamp 212 broadcasts a wireless signal 204 for communication with the mobile device 202. The television set 220 broadcasts a wireless signal 210 for communication with the mobile device 202. The thermostat 208 broadcasts a wireless signal 206 for communication with the mobile device 202. The dining room lamp 218 broadcasts a wireless signal 226 for communication with the mobile device 202. The oven 224 broadcasts a wireless signal 214 for communications with the mobile device 202. The bedroom lamp 216 broadcasts a wireless signal 222 for communications with the mobile device 202. The gateway 238 communicates wirelessly with the mobile device 202, the television set 220, the living room lamp 212, the thermostat 208, the dining room lamp 218, the oven 224, and the bedroom lamp 216.

The system environment 200 may be operated in accordance with the process embodiments described in FIG. 11, FIG. 12, FIG. 13, and FIG. 14.

Figure 3:
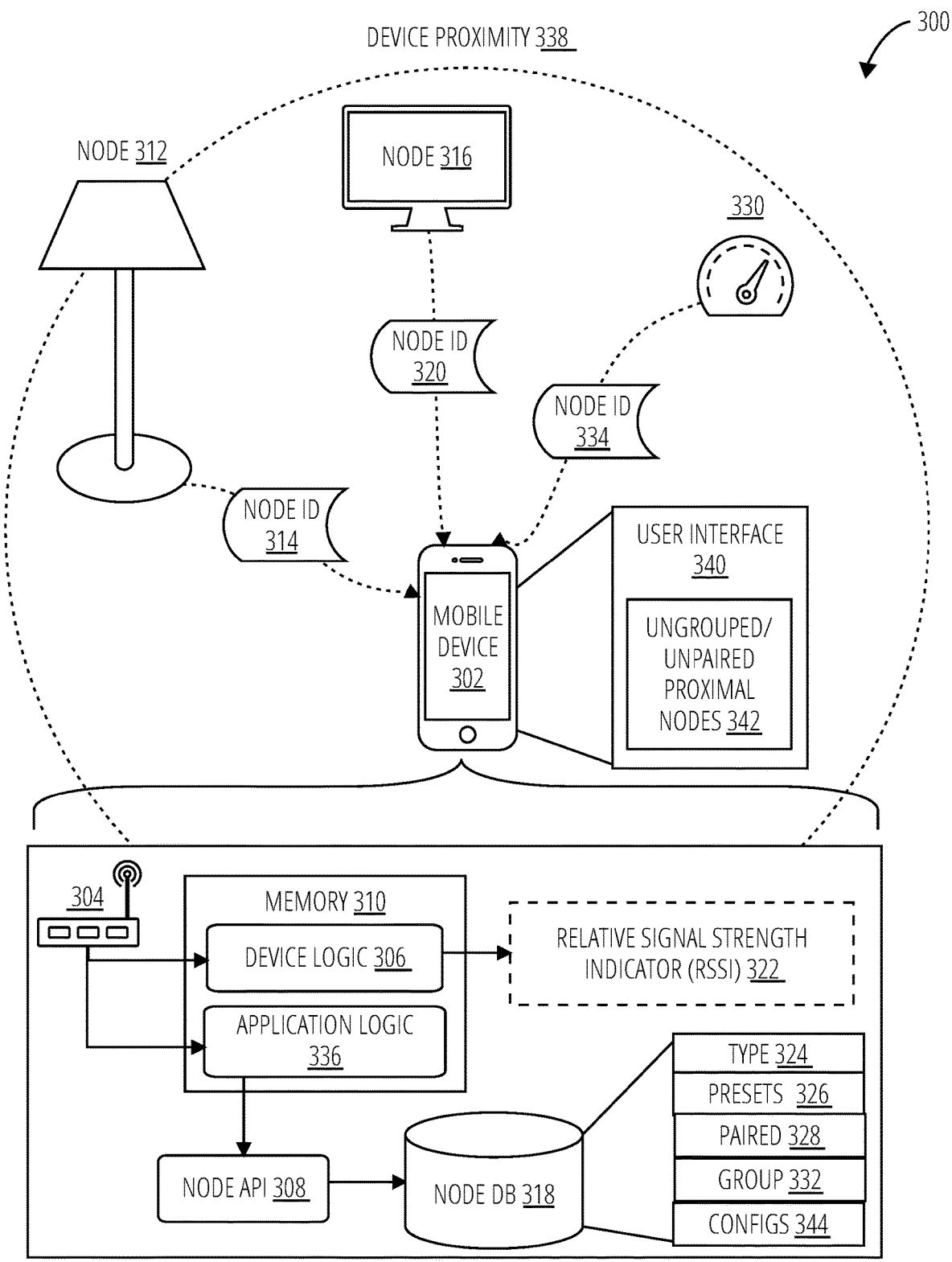
FIG. 3 illustrates an embodiment of a system 300 for location and proximity awareness.

Referencing FIG. 3, a system for location and proximity awareness 300 comprises an admin node 302 comprising a device proximity 338. The device proximity 338 of the admin node 302 comprises a lamp node 312 emitting a node ID 314, a television node 316 emitting a node ID 320, and a thermostat node 330 emitting a node ID 334.

The admin node 302 comprises a transceiver 304, a memory 310, a node application program interface 308, and a node application database 318. The memory 310 comprises device logic 306 and application logic 336. The device logic 306 analyzes the node ID 314, the node ID 320, and the node ID 334 received by the transceiver 304 to determine a relative signal strength indicator (RSSI) 322 for the lamp node 312, the television node 316, and the thermostat node 330, respectively. The application logic 336 operates a node application program interface 308 to perform a lookup of the node ID 314, the node ID 320, and the node ID 334 in the node application database 318 to identify a node type 324, preset node controls 326, paired nodes 328, grouped nodes 332, and configured node actions 344.

The admin node 302 displays a user interface 340 comprising ungrouped/unpaired proximal nodes 342.

The system for location and proximity awareness 300 may be operated in accordance with the processes embodiments described in FIG. 11, FIG. 12, FIG. 13, and FIG. 14.

The nodes of the system 300 for periodic wireless mesh creation may operate as nodes in a system for integrating building automation with location awareness utilizing wireless mesh technology illustrated in FIG. 4, FIG. 5, FIG. 6, and FIG. 7.

Figure 4:
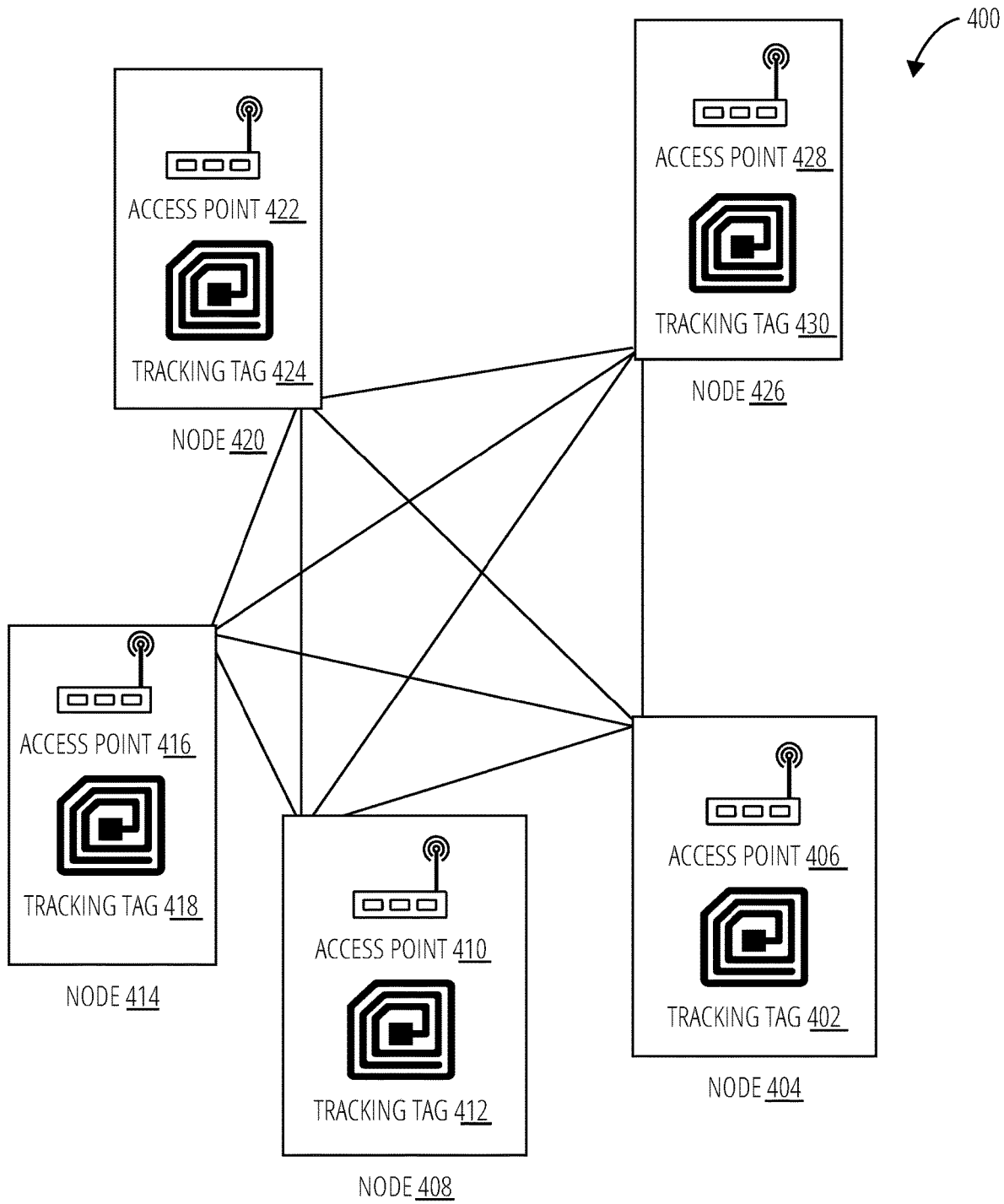
FIG. 4 illustrates an embodiment of a system 400 for integrating building automation with location awareness utilizing wireless mesh technology.

FIG. 4 illustrates an embodiment of a system 400 for integrating building automation with location awareness utilizing wireless mesh technology, which includes various nodes (e.g., node 420, node 426, node 404, node 414, and node 408. The node 420 comprises an access point 422 and a tracking tag 424. The node 426 comprises an access point 428 and a tracking tag 430. The node 404 comprises an access point 406 and a tracking tag 402. The node 408 comprises an access point 410 and a tracking tag 412. The node 414 comprises an access point 416 and a tracking tag 418.

The nodes of the system for integrating building automation with location awareness utilizing wireless mesh technology 400 operate as mesh network nodes as previously described.

Figure 5:
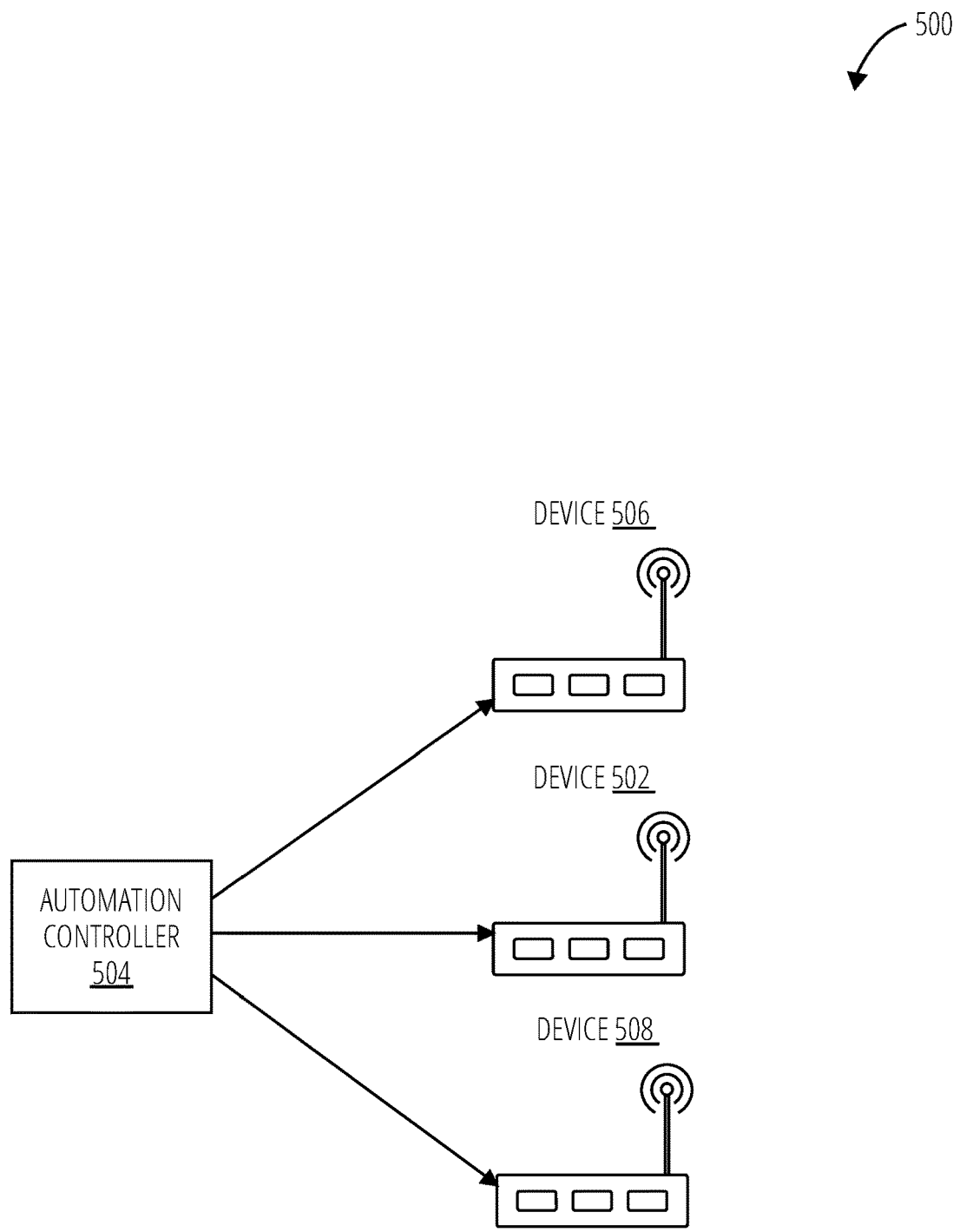
FIG. 5 illustrates an embodiment of a system 500 for integrating building automation with location awareness utilizing wireless mesh technology.

FIG. 5 illustrates an embodiment of a system 500 for integrating building automation with location awareness utilizing wireless mesh technology, which includes an automation controller 504 and various devices (e.g., a device 502, a device 506, and a device 508). The automation controller 504 communicates with and manages the various devices, as further elaborated herein.

Figure 6:
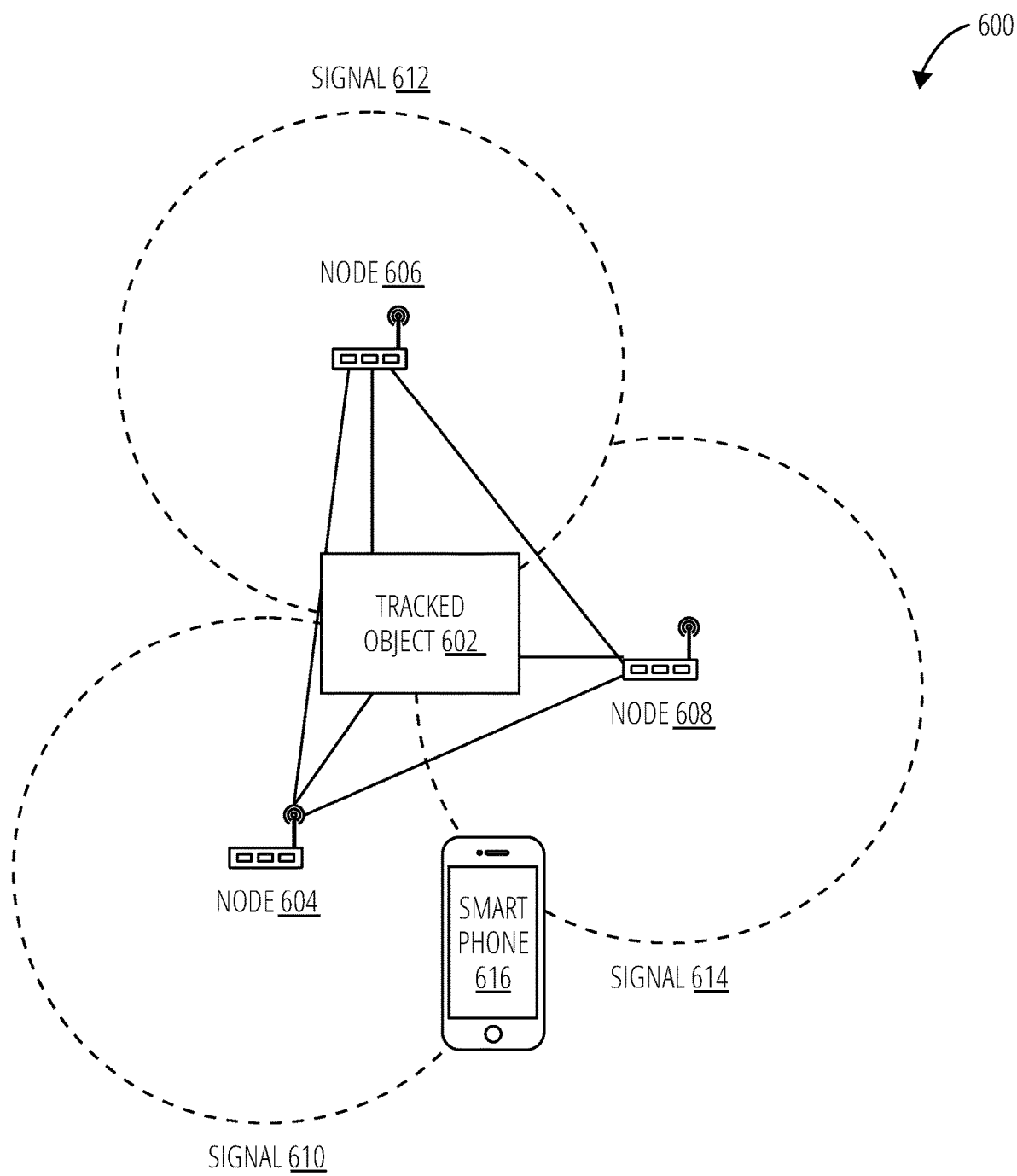
FIG. 6 illustrates an aspect of a system 600 for integrating building automation with location awareness utilizing wireless mesh technology.

FIG. 6 illustrates an embodiment of a system 600 for integrating building automation with location awareness utilizing wireless mesh technology, which includes a tracked object 602, a smart phone 616, and various nodes (e.g., the node 606, the node 608, and the node 604) emitting various signals (e.g., the signal 612, the signal 614, and the signal 610).

The smart phone 616 may cooperate with the various nodes to monitor a location of the tracked object 602 using the various signals, as further elaborated herein.

Figure 7:
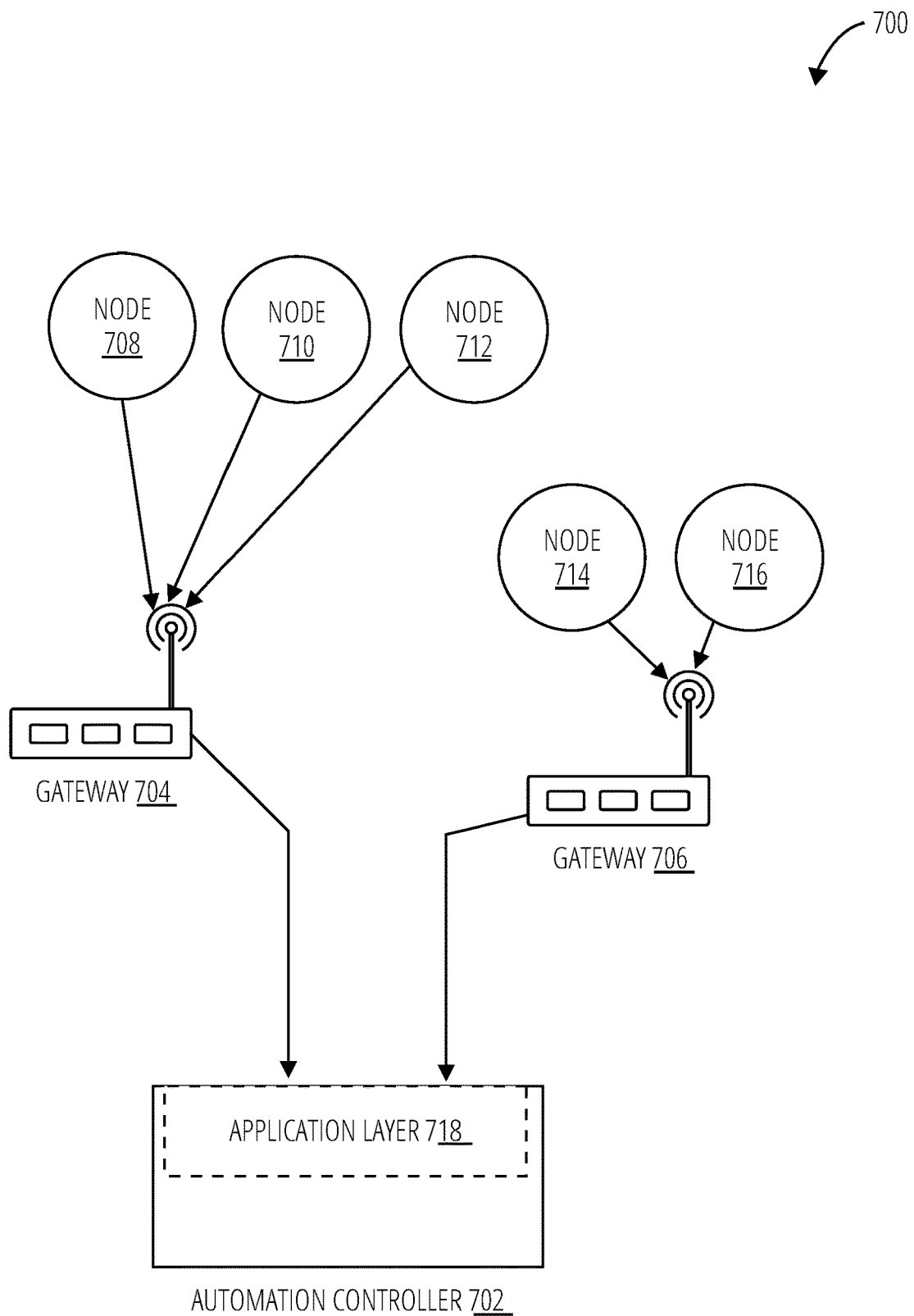
FIG. 7 illustrates an embodiment of a system 700 for integrating building automation with location awareness utilizing wireless mesh technology.

FIG. 7 illustrates an embodiment of a system 700 for integrating building automation with location awareness utilizing wireless mesh technology, which includes various nodes (e.g., the node 708, the node 710, the node 712, the node 714, and the node 716) a gateway 704, a gateway 706, an application layer 718 and an automation controller 702. The automation controller 702 may operate as a management system or node for the mesh network that includes the various nodes and gateways, as further elaborated herein.

Figure 8:
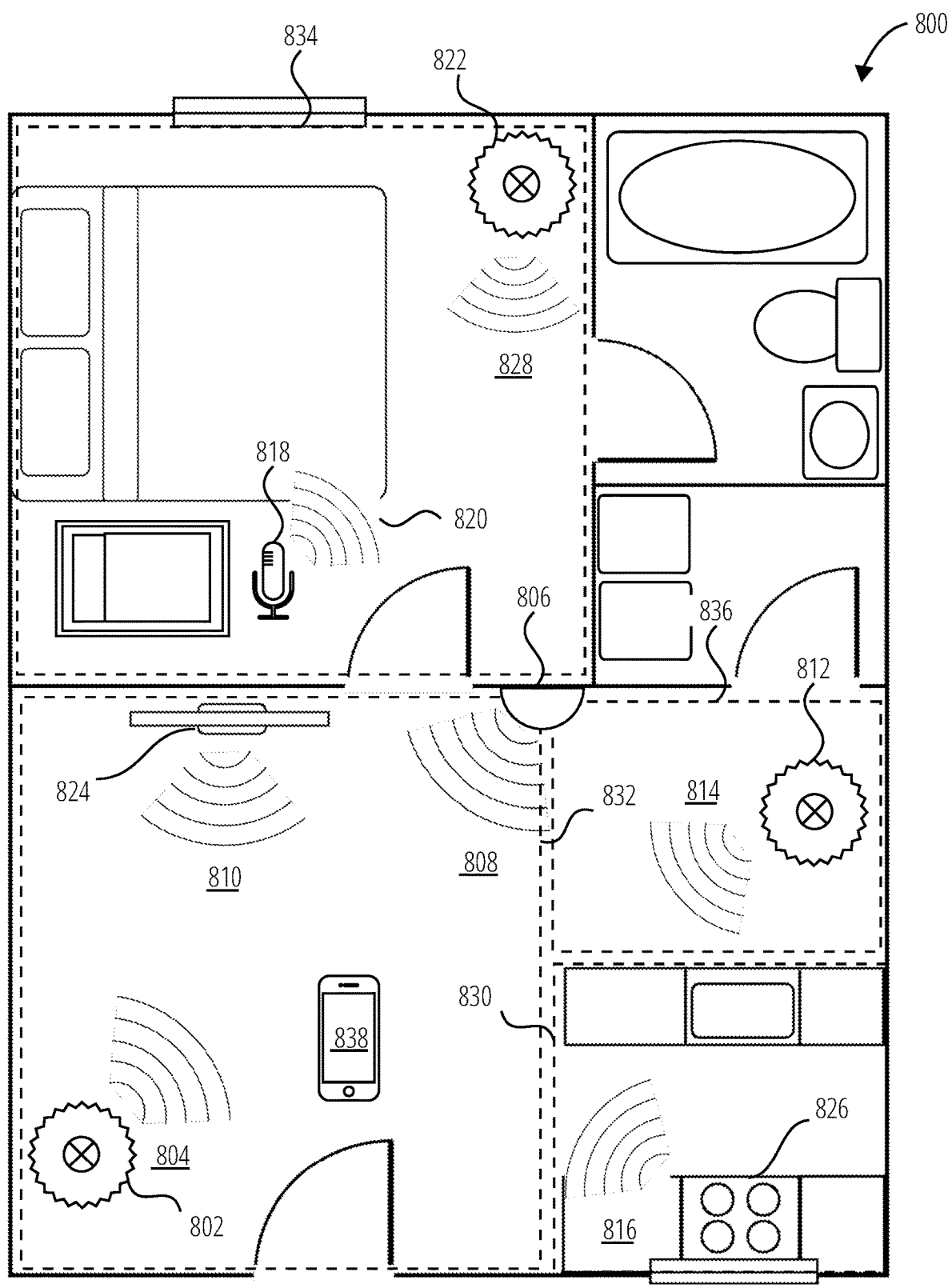
FIG. 8 illustrates an embodiment of a system 800 for location and proximity awareness.

Referencing FIG. 8, a system 800 for location and proximity awareness comprises an admin node 838 in proximity to location based node groups. In the system for location and proximity awareness 800, the location based node groups comprise a living room group 832, a bedroom group 834, a dining room group 836, and a kitchen group 830. The living room group 832 comprises a living room lamp node 802 emitting a node id 804, a thermostat node 806 emitting a node id 808, and a television node 824 emitting a node id 810. The bedroom group 834 comprises a baby monitor node 818 emitting a node id 820 and a bedroom lamp node 822 emitting a node id 828. The kitchen group 830 comprises a an oven node 826 emitting a node id 816. The dining room group 836 comprises a dining room lamp node 812 emitting a node id 814.

The system 800 for location and proximity awareness may be operated in accordance with the processes embodiments described in FIG. 11, FIG. 12, FIG. 13, and FIG. 14.

Figure 9:
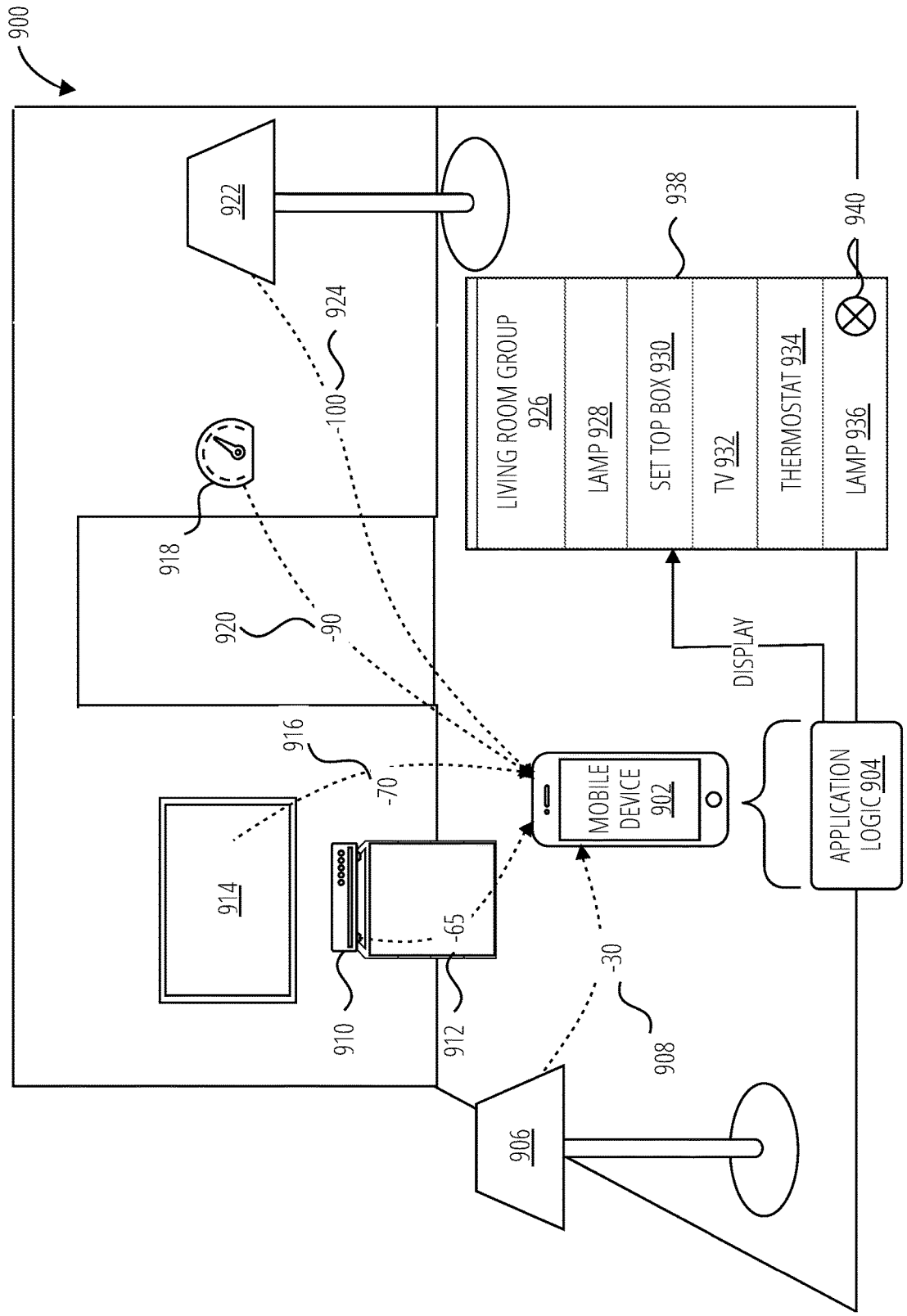
FIG. 9 illustrates an embodiment of a system 900 for location and proximity awareness.

Referencing FIG. 9, a system 900 for location and proximity awareness comprises an admin node 902 comprising application logic 904. The admin node 902 is positioned in proximity to a living room lamp node 906 emitting at an RSSI value 908, a set top box node 910 emitting at an RSSI value 912, a television node 914 emitting at an RSSI value 916, a thermostat node 918 emitting at an RSSI value 920, and a dining room lamp node 922 emitting at an RSSI value 924. The application logic 904 ranks the proximity of the living room lamp node 906, the television node 914, the thermostat node 918, and the dining room lamp node 922 based on their RSSI values. The application logic 904 identifies a node group for the location of the admin node 902 based on the proximity of the identified nodes and their RSSIs. The application logic 904 displays a user interface 938 in the admin node 902 listing the living room lamp 928, the set top box 930, the television 932, the thermostat 934, and the dining room lamp 936 as part of the living room group 926 ordered based on proximity to the admin node 902. The dining room lamp 936 may be removed from the living room group 926 using the group removal indicator 940 displayed through the user interface 938.

The system 900 for location and proximity awareness may be operated in accordance with the processes embodiments described in FIG. 11, FIG. 12, FIG. 13, and FIG. 14.

Figure 10:
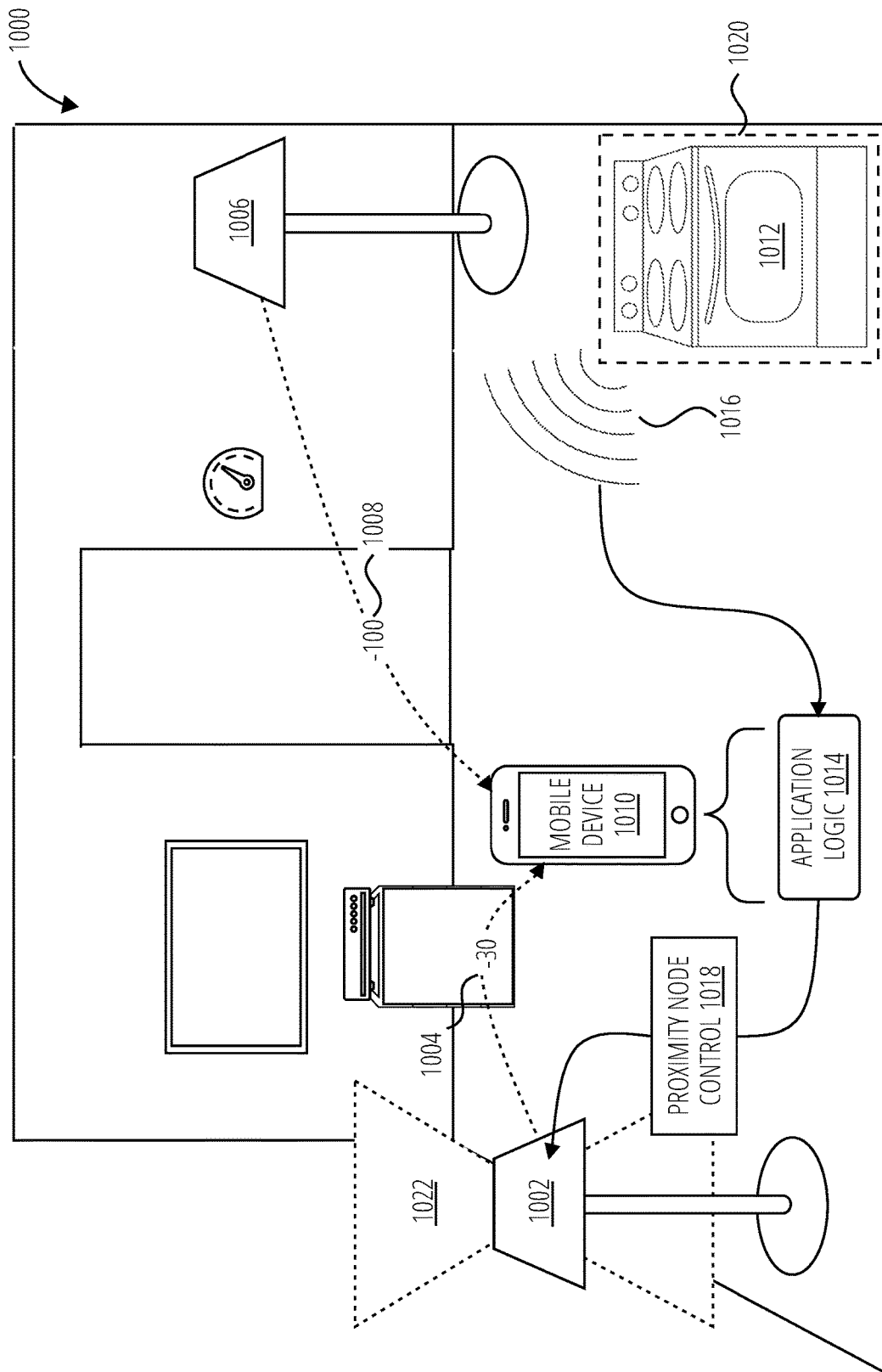
FIG. 10 illustrates an embodiment of a system 1000 for location and proximity awareness communicating a notification to a nearby device.

Referencing FIG. 10, a system 1000 for location and proximity awareness comprises a living room lamp node 1002 emitting at RSSI value 1004, a kitchen lamp node 1006 emitting at RSSI value 1008, an admin node 1010, and an oven node 1012. The admin node 1010 comprises application logic 1014. The oven node 1012 is configured to detect an oven event 1020 (e.g., oven preheat temperature, oven timer going off, etc.). The oven event 1020 is communicated to the application logic 1014 as an oven event notification 1016. The application logic 1014 identifies the closest node to transmit a proximity node control 1018 based on the lowest RSSI value. The application logic 1014 determines the living room lamp node 1002 is closets in proximity to the admin node 1010 and transmits a proximity node control 1018. The proximity node control 1018 controls the living room lamp node 1002 and node control action 1022 (e.g., turn lights on/off, change color of lights, blink lights, etc.).

The system 1000 for location and proximity awareness may be operated in accordance with the processes embodiments described in FIG. 11, FIG. 12, FIG. 13, and FIG. 14.

In an embodiment, a baby monitor may be configured to activate types of appliances (e.g., lamps, speakers, etc.) proximal to the mobile device upon detecting the infant waking from their sleep. The baby monitor may operate on a wireless mesh network with other nearby devices or a local area network. The baby monitor may send an event notification upon detecting that an infant as awoken from sleep through a sensor (e.g., microphone, camera, etc.) to the application logic. The application logic may determine the nearest appliance of a type of appliances to control based on the relative signal strength indicator for each device.

Figure 11:
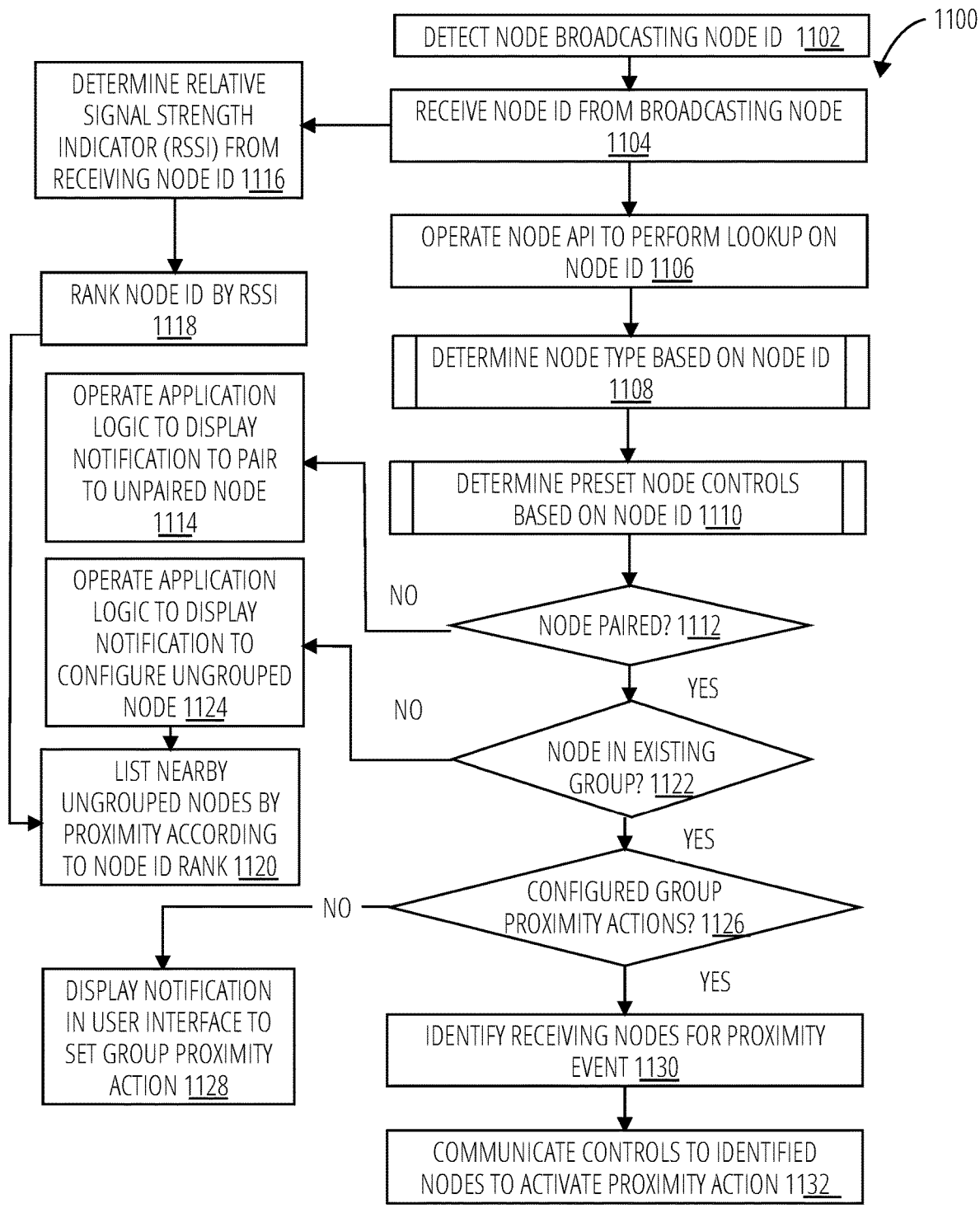
FIG. 11 illustrates an embodiment of a process 1100 for operating a system for proximity and location awareness.

Referencing FIG. 11, a process 1100 for operating a system for proximity and location awareness detects a node broadcasting a node ID through operation of an admin node (block 1102). The admin node may be accomplished by a mobile device comprising a transceiver and memory comprising application logic and device logic. The transceiver receives the node id from the broadcasting node (block 1104).

The admin node operates device logic stored in memory to determine a relative signal strength indicator (RSSI) for the node ID (block 1116). In block 1118, the process for operating a system for proximity and location awareness 1100 ranks received node IDs by the RSSIs.

The application logic operates a node API to perform a lookup on the node ID received from the broadcasting node (block 1106). The application logic performs a lookup through the node API to determine node type (subroutine block 1108) and preset node controls (subroutine block 1110). The application logic determines if the broadcasting node has previously paired with the admin node (decision block 1112). If the process for operating a system for proximity and location awareness 1100 determines the broadcasting node has not previously paired with the admin node, the process 1100 for operating a system for proximity and location awareness operates the application logic to display a notification through the admin node to pair the unpaired node (block 1114). Else, if the process 1100 for operating a system for proximity and location awareness determines the broadcasting node has previously paired with the admin, the process 1100 for operating a system for proximity and location awareness determines whether the broadcasting node has been added to an existing node group (decision block 1122).

If the process 1100 for operating a system for proximity and location awareness determines no existing node group for the broadcasting node, the process 1100 for operating a system for proximity and location awareness operates the application to display a notification to pair to the ungrouped node (block 1124) and lists the nearby ungrouped nodes by proximity according to the ranked node IDs (block 1120). Else if the process 1100 for operating a system for proximity and location awareness determines an existing node group for the broadcasting node, the process 1100 for operating a system for proximity and location awareness determines presence of a configured group proximity action to perform (decision block 1126). If the process 1100 for operating a system for proximity and location awareness determines no configured group proximity action, the system environment 200 displays a notification in a user interface to set a group proximity action (block 1128). Else if the process 1100 for operating a system for proximity and location awareness determines a configured group proximity action for the node group of the broadcasting node, the process 1100 for operating a system for proximity and location awareness identifies nearby receiving nodes to the admin node (block 1130) and communicates the node control to the identified nodes to activate the proximity action (block 1132).

Figure 12:
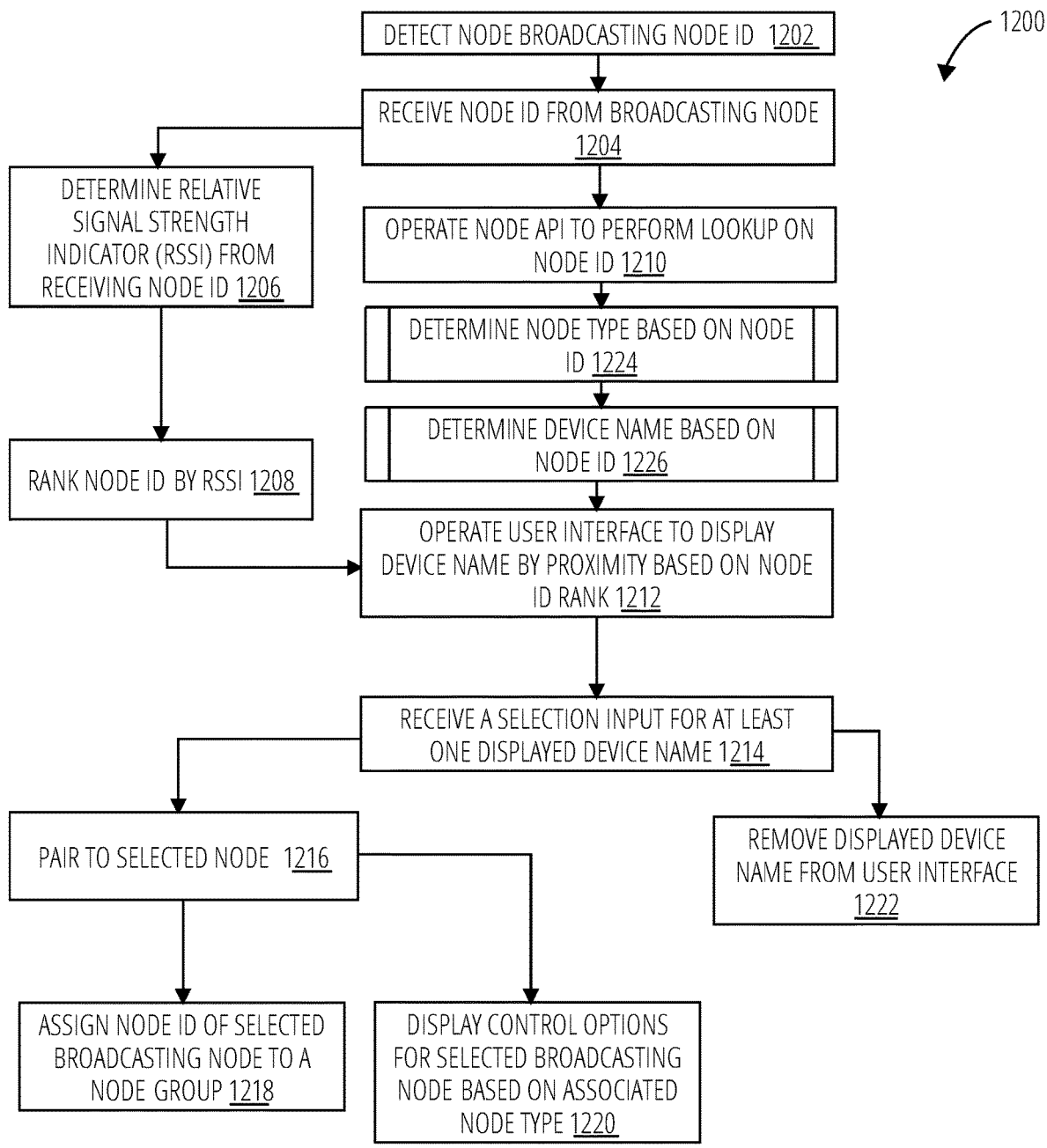
FIG. 12 illustrates an embodiment of a process 1200 for operating system for location awareness.

Referencing FIG. 12, a process 1200 for operating a system for location awareness detects a node broadcasting a node ID through operation of an admin node (block 1202).

The admin node may be implemented by a mobile device comprising a transceiver and memory comprising application logic and device logic. The transceiver receives the node id from the broadcasting node (block 1204). The admin node operates device logic stored in memory to determine a relative signal strength indicator (RSSI) for the node ID (block 1206).

In block 1208, the process 1200 for operating a system for location awareness ranks received node IDs by the RSSIs. The Application logic operates a node API to perform a lookup on the node ID received from the broadcasting node (block 1210). The process 1200 for operating a system for location awareness determines a node type (subroutine block 1224) and node name (subroutine block 1226) based on node ID.

The process 1200 for operating a system for location awareness operates a user interface to display device name by proximity based on node ID rank (block 1212). The process 1200 for operating a system for location awareness receives a selection input for at least one displayed device name (block 1214). The admin node pairs to the selected node (block 1216). While paired, the process 1200 for operating a system for location awareness may assign the node ID of the displayed device name to a node group (block 1218) and may display control options for controlling the broadcasting node based on the associated node type (block 1220).

The process 1200 for operating a system for location awareness may receive a selection input for a displayed device name (block 1214) to remove the displayed device name from the user interface (block 1222).

Figure 13:
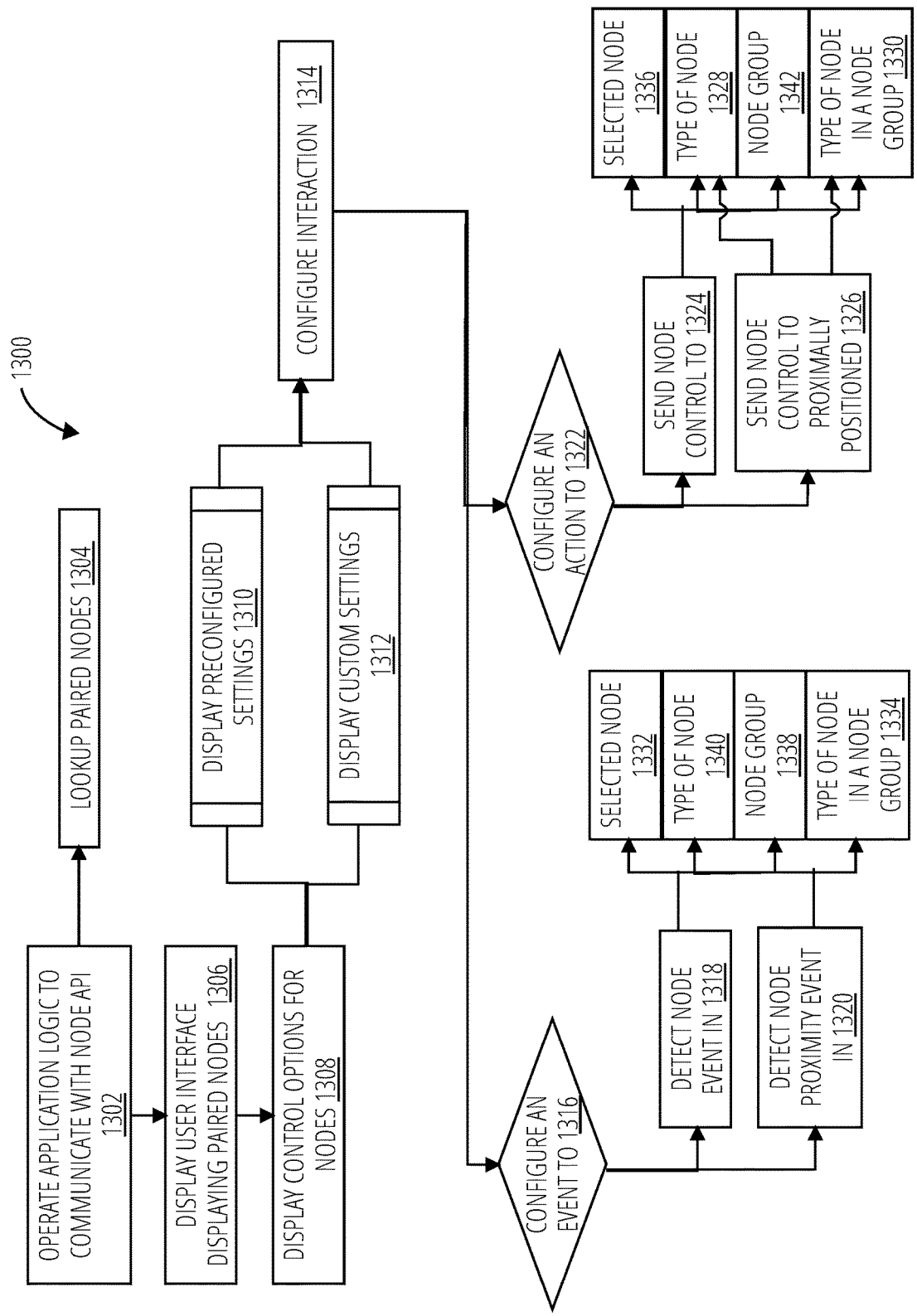
FIG. 13 illustrates an embodiment of a process 1300 for operating a system for proximity and location awareness.

Referencing FIG. 13, a process 1300 for operating a system for proximity and location awareness operates application logic to communicate with the node API (block 1302). The process 1300 for operating a system for proximity and location awareness performs a lookup for nodes paired to the admin node (block 1304).

The process 1300 for operating a system for proximity and location awareness displays a user interface displaying paired nodes (block 1306). The user interface displays control options for the paired nodes (block 1308). The user interface may display pre-configured settings for the paired nodes (subroutine block 1310). The user interface may display custom setting for the paired nodes (subroutine block 1312).

The process 1300 for operating a system for proximity and location awareness configures an interaction between nodes (block 1314). The process 1300 for operating a system for proximity and location awareness configures an event to initiate a subsequent action to be performed (decision block 1316). In decision block 1316, the process 1300 for operating a system for proximity and location awareness may configure an event to detect other node events and notifications (block 1318) or may configure to detect an event as a node proximity event (block 1320) where the location/position of the admin node triggers the event. The node event may be detected in a selected node (block 1332), a type of nodes (block 1340), a node group (block 1338), or a type of node in a node group (block 1334).

The process 1300 for operating a system for proximity and location awareness may configure an action to be performed following a configured event (decision block 1322). In decision block 1322, the process 1300 for operating a system for proximity and location awareness may configure an action as a node control to send to some nodes (block 1324) or may configure the action as a node control to send to proximally positioned nodes (block 1326). The action performed may be sent as a node control to a selected node (block 1336), a type of node (block 1328), a node group (block 1342), or type of node in a node group (block 1330). The process 1300 for operating a system for proximity and location awareness may configure an action to send a node control to a proximally positioned type of node (block 1328), or a type of node in a node group (block 1330).

Figure 14:
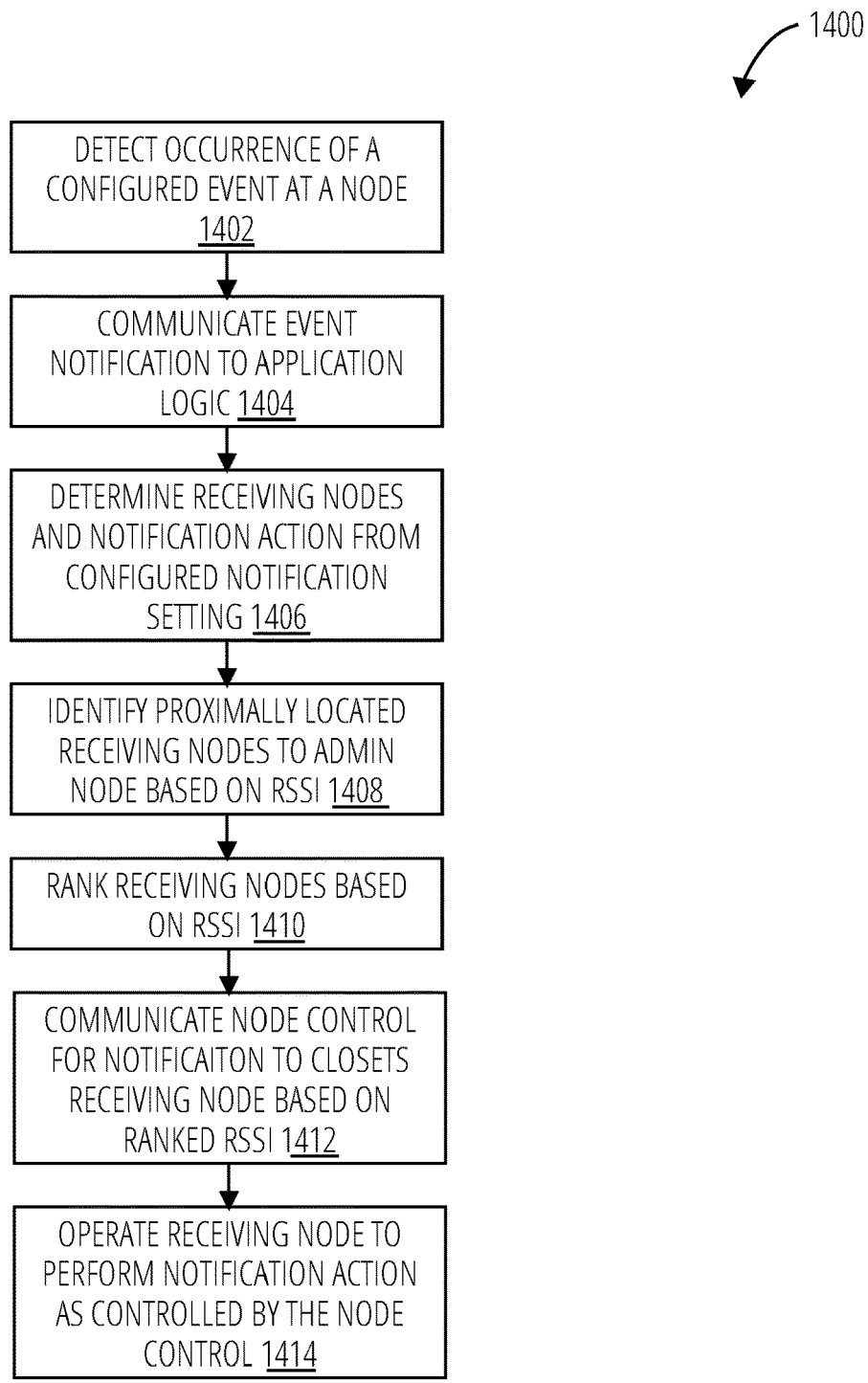
FIG. 14 illustrates an embodiment of a process 1400 of operating a system for proximity and location awareness.

Referencing FIG. 14, a process 1400 of operating a system for proximity and location awareness detects the occurrence of a configured event at a node (block 1402). The process 1400 of operating a system for proximity and location awareness communicates the event notification to the application logic (block 1404). The application logic determines the receiving nodes and the notification action from the configured notification settings (block 1406).

The process 1400 of operating a system for proximity and location awareness identifies proximally located receiving nodes to the admin node based on RSSI values (block 1408). The process 1400 of operating a system for proximity and location awareness ranks the receiving nodes based on the RSSI values (block 1410). The process 1400 of operating a system for proximity and location awareness communicates a node control for the notification event to the closets receiving node based on the ranked RSSI (block 1412). The process 1400 of operating a system for proximity and location awareness operates the receiving node to perform notification action as controlled by the node control (block 1414).

Figure 15:
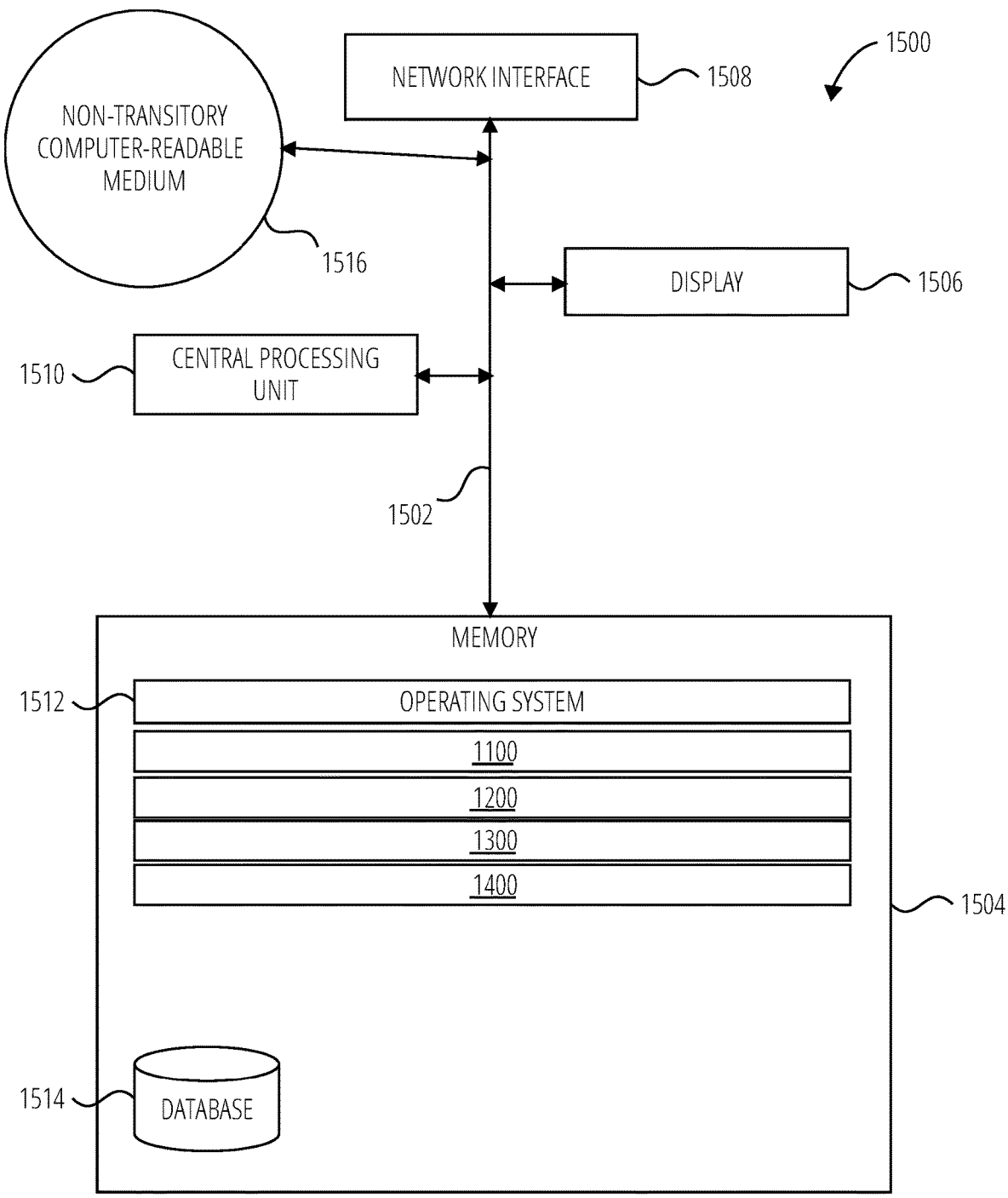
FIG. 15 illustrates a system 1500 in accordance with one embodiment.

FIG. 15 illustrates several components of an exemplary system 1500 in accordance with one embodiment. In various embodiments, system 1500 may include a desktop PC, server, workstation, mobile phone, laptop, tablet, set-top box, appliance, or other computing device that is capable of performing operations such as those described herein. In some embodiments, system 1500 may include many more components than those shown in FIG. 15. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1500 may comprise one or more physical and/or logical devices that collectively provide the functionalities described herein. In some embodiments, system 1500 may comprise one or more replicated and/or distributed physical or logical devices.

In some embodiments, system 1500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1500 includes a bus 1502 interconnecting several components including a network interface 1508, a display 1506, a central processing unit 1510, and a memory 1504.

Memory 1504 generally comprises a random access memory ("RAM") and permanent non-transitory mass storage device, such as a hard disk drive or solid-state drive. Memory 1504 stores an operating system 1512.

These and other software components may be loaded into memory 1504 of system 1500 using a drive mechanism (not shown) associated with a non-transitory computer-readable medium 1516, such as a floppy disc, tape, DVD/CD-ROM drive, memory card, or the like.

Memory 1504 also includes database 1514. In some embodiments, system 1500 may communicate with database 1514 via network interface 1508, a storage area network ("SAN"), a high-speed serial bus, and/or via the other suitable communication technology.

In some embodiments, database 1514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 16:
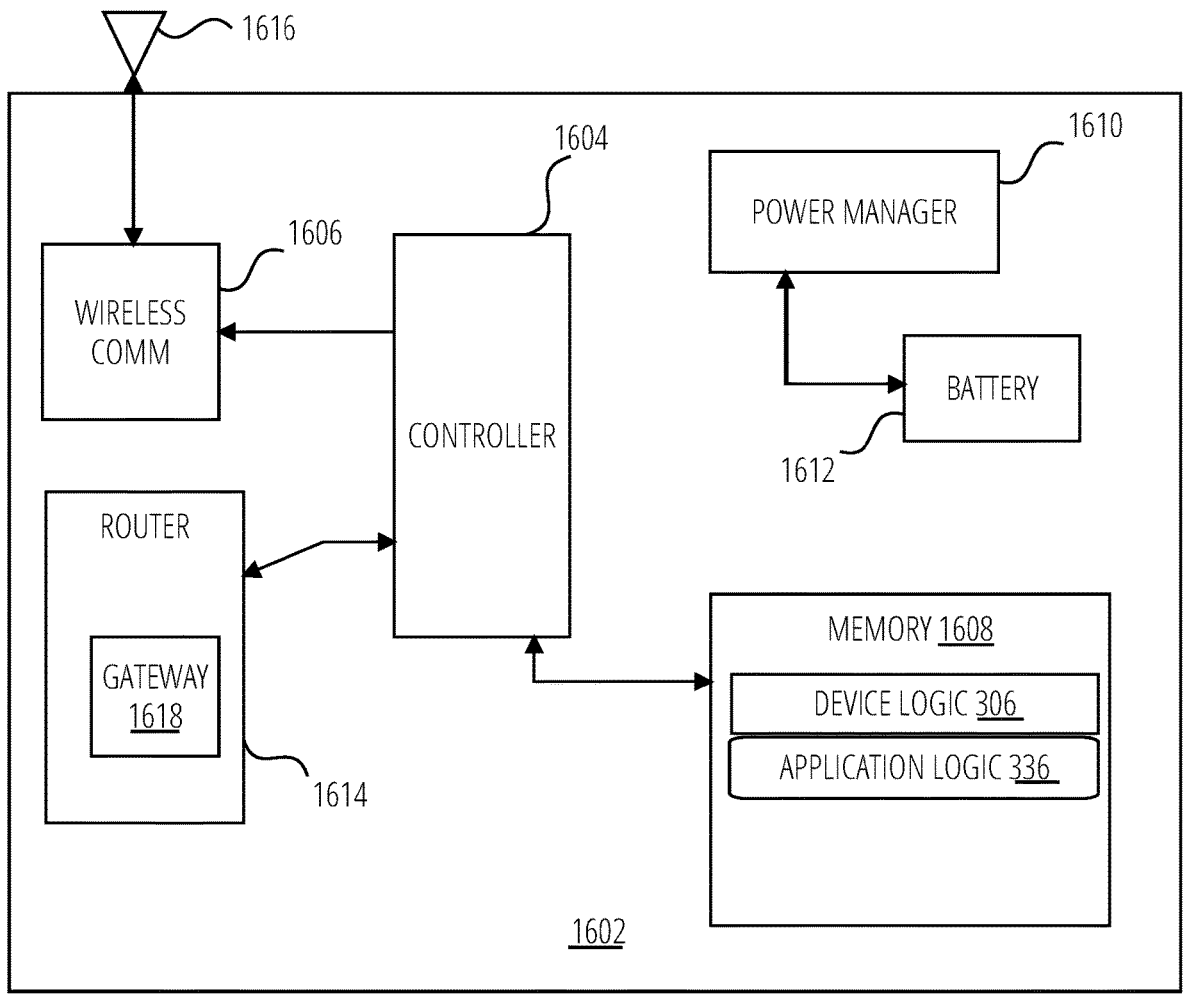
FIG. 16 illustrates an embodiment of a mobile wireless node 1602.

Referring to FIG. 16, a mobile wireless node 1602 includes an antenna 1616, a signal processing and system control 1604, a wireless communication 1606, a memory 1608, a power manager 1610, a battery 1612, a router 1614, a mobile wireless node 1602, and a gateway 1618.

The signal processing and system control 1604 controls and coordinates the operation of other components as well as providing signal processing for the mobile wireless node 1602. For example the signal processing and system control 1604 may extract baseband signals from radio frequency signals received from the wireless communication 1606 logic, and process baseband signals up to radio frequency signals for communications transmitted to the wireless communication 1606 logic. The signal processing and system control 1604 may comprise a central processing unit, digital signal processor, one or more controllers, or combinations of these components.

The wireless communication 1606 includes memory 1608 which may be utilized by the signal processing and system control 1604 to read and write instructions (commands) and data (operands for the instructions). The memory 1608 may include device logic 306 and application logic 336.

The router 1614 performs communication routing to and from other nodes of a mesh network (e.g., wireless mobile mesh network 100) in which the mobile wireless node 1602 is utilized. The router 1614 may optionally also implement a network gateway 1618.

The components of the mobile wireless node 1602 may operate on power received from a battery 1612. The battery 1612 capability and energy supply may be managed by a power manager 1610.

The mobile wireless node 1602 may transmit wireless signals of various types and range (e.g., cellular, WiFi, BlueTooth, and near field communication i.e. NFC). The mobile wireless node 1602 may also receive these types of wireless signals. Wireless signals are transmitted and received using wireless communication 1606 logic coupled to one or more antenna 1616. Other forms of electromagnetic radiation may be used to interact with proximate devices, such as infrared (not illustrated).

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

What is claimed:

1. An administrator node for multi-node mesh network, the administrator node comprising:
    a wireless receiver to receive broadcast signals from a plurality of broadcast nodes of the mesh network, each of the broadcast signals comprising a node ID identifying a source broadcast node of the broadcast signals;
    logic to determine a relative signal strength indicator for each received node ID and to rank received node IDs by an associated relative signal strength indicator;
    logic to perform a lookup of each node ID to determine a node type and preset node controls for each source broadcast node; and
    logic to determine if each source broadcast node has previously paired with the administrator node, and on condition that a particular source broadcast node has not previously paired with the administrator node, enable a user of the administrator node to pair the particular source broadcast node with the administrator node, and on condition that the particular source broadcast node has previously paired with the administrator node and has not been added to an existing node group, prompting the user of the administrator node with a list of proximate ungrouped nodes of the mesh network ordered by the ranked node IDs.

2. The administrator node of claim 1, further comprising logic to, on condition that the particular source broadcast node has been added to the existing node group, determine existence of a configured group proximity action to perform.

3. The administrator node of claim 2, further comprising logic to, on condition that the configured group proximity action does not exist, prompting the user of the administrator node to set the configured group proximity action.

4. The administrator node of claim 2, further comprising logic to, on condition that the configured group proximity action exists, identify proximate receiving nodes of the administrator node and communicating a control to the proximate receiving nodes to activate the configured group proximity action.

* * * * *